(12) United States Patent
Hwang et al.

(10) Patent No.: US 11,125,886 B2
(45) Date of Patent: Sep. 21, 2021

(54) METHOD AND APPARATUS FOR MULTIPATH MITIGATION IN GNSS

(71) Applicants: Electronics and Telecommunications Research Institute, Daejeon (KR); INDUSTRY ACADEMY COOPERATION FOUNDATION OF SEJONG UNIVERSITY, Seoul (KR)

(72) Inventors: Yoo La Hwang, Daejeon (KR); Jae Young Ahn, Daejeon (KR); Byoung Sun Lee, Daejeon (KR); Ji Hun Cha, Daejeon (KR); Byung Woon Park, Seoul (KR); Yong Jun Lee, Seoul (KR); Cheol Soon Lim, Seoul (KR)

(73) Assignees: Electronics and Telecommunications Research Institute, Daejeon (KR); INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 71 days.

(21) Appl. No.: 16/708,143

(22) Filed: Dec. 9, 2019

(65) Prior Publication Data
US 2020/0271792 A1    Aug. 27, 2020

(30) Foreign Application Priority Data
Feb. 25, 2019 (KR) .................. 10-2019-0022073

(51) Int. Cl.
*G01S 19/40* (2010.01)
*G01S 19/22* (2010.01)

(52) U.S. Cl.
CPC .............. *G01S 19/22* (2013.01); *G01S 19/40* (2013.01)

(58) Field of Classification Search
CPC .......... G01S 19/22; G01S 19/40; G01S 19/42; G01S 19/09; G01S 19/05; G01S 19/48
(Continued)

(56) References Cited

U.S. PATENT DOCUMENTS

| 8,717,233 B2 | 5/2014 | Ashjaee et al. |
| 9,007,260 B2 * | 4/2015 | Rachlin ................... G01S 19/40 342/357.61 |

(Continued)

FOREIGN PATENT DOCUMENTS

| KR | 100438396 B1 | 7/2004 |
| KR | 100972815 B1 | 7/2010 |

(Continued)

OTHER PUBLICATIONS

Ali Pirsiavash et al., GNSS Code Multipath Mitigation by Cascading Measurement Monitoring Techniques, Sensors, Jun. 19, 2018, pp. 1-32, MDPI.

(Continued)

*Primary Examiner* — Harry K Liu
(74) *Attorney, Agent, or Firm* — William Park & Associates Ltd.

(57) ABSTRACT

The present invention provides a method of performing a position measurement on the basis of a signal from a global navigation satellite system (GNSS). The method includes: receiving initial position information; estimating an initial value of a multipath error through a measurement of the GNSS signal on the basis of the received initial position information; estimating a multipath error from the initial value of the multipath error on the basis of a change in the measurement; removing the estimated multipath error from the measurement of the GNSS signal; and performing the position measurement on the basis of the GNSS measurement from which the multipath error is removed.

20 Claims, 7 Drawing Sheets

(58) Field of Classification Search
USPC .................................................. 342/357.23
See application file for complete search history.

(56) References Cited

U.S. PATENT DOCUMENTS

| | | | |
|---|---|---|---|
| 9,329,274 B2 | 5/2016 | Schipper et al. | |
| 9,383,449 B2 | 7/2016 | Kim et al. | |
| 10,162,061 B2 | 12/2018 | Kim et al. | |
| 2005/0216210 A1 | 9/2005 | Bartone et al. | |
| 2007/0225912 A1* | 9/2007 | Grush | G07B 15/02 701/469 |
| 2008/0114544 A1* | 5/2008 | Liu | G01S 19/18 701/480 |
| 2014/0266873 A1* | 9/2014 | Pighin | G01S 19/07 342/357.23 |
| 2020/0049837 A1* | 2/2020 | Werner | G01S 19/48 |

FOREIGN PATENT DOCUMENTS

| KR | 1020140026902 A | 3/2014 |
|---|---|---|
| KR | 101433908 B1 | 8/2014 |
| KR | 101640665 B1 | 7/2016 |

OTHER PUBLICATIONS

Paul D. Groves, "Shadow Matching: A New GNSS Positioning Technique for Urban Canyons", The Journal of Navigation (2011), pp. 417-430, vol. 64, No. 3, The Royal Institute of Navigation.

Rakesh Kumar et al., A Novel GNSS Positioning Technique for Improved Accuracy in Urban Canyon Scenarios using 3D City Model, Sep. 8-12, 2014, pp. 1-10, Session D6, ION GNSS+ 2014, Tampa, FL.

Ziyi Jiang et al., GNSS NLOS and Multipath Error Mitigation using Advanced Multi-Constellation Consistency Checking with Height Aiding, 25th International Technical Meeting of the Satellite Division of The Institute of Navigation, Sep. 17-21, 2012, pp. 79-88, Nashville, TN.

Sul Gee Park et al., A Performance Improvement on Navigation Applying Measurement Estimation in Urban Weak Signal Environment, Maritime Safety Research Division, Korea Research Institute of Ships & Ocean Engineering, Daejeon, Korea, Journal of the Korea Institute of Information and Communication Engineering vol. 18, No. 11, 2745~2752 Nov. 2014.

* cited by examiner

METHOD AND APPARATUS FOR MULTIPATH MITIGATION IN GNSS

CROSS REFERENCE TO RELATED APPLICATION

The present application claims priority to Korean Patent Application No. 10-2019-0022073, filed Feb. 25, 2019, the entire contents of which is incorporated herein for all purposes by this reference.

BACKGROUND OF THE INVENTION

Field of the Invention

The present disclosure relates to a method and apparatus for multipath mitigation in a global navigation satellite system (GNSS) and, more particularly, to a method and apparatus for multipath mitigation in GNSS on the basis of pre-measured point information and estimation of time difference between multiple satellite groups.

More particularly, the present invention relates to a method and apparatus which estimates time information of different satellite groups using pre-measured point information and removes multipath errors of GNSS in urban areas to increase the accuracy of GNSS position measurement.

Description of the Related Art

Various errors may exist in the GNSS signal. The GNSS signal transmitted at an altitude of approximately 20,000 km or more includes user-dependent errors such as multipath error and receiver noise, in addition to common errors such as ionospheric error, tropospheric error, satellite orbital error, and clock error capable of being eliminated by a differential GNSS (DGNSS) technique using a reference station. The user-dependent errors range from several hundred meters to several kilometers in the case of signals received from non-line of sight (NLOS) satellites in a satellite signal random reception environment, such as a city with high-rise buildings, and accordingly various methods of removing the errors have been presented.

For example, a method of excluding signals received from NLOS satellites using image information or surrounding topographic information, and a method of determining an excess multipath error using a difference between a code and a carrier phase measurement and then removing the multipath error may be performed. However, the above-described methods have difficulties being processed in real time or have practical limitations, such as requiring additional equipment or requiring a large amount of calculation. In addition, since most methods apply a method of excluding excessive multipath errors from position measurement, it is difficult to secure satellite visibility in urban areas. Thus, a practical algorithm may be needed that does not reduce the number of visible satellites needed for performing the position measurement without the need for additional equipment or large amounts of computation. In addition, it may be necessary to find a method for efficiently utilizing information of multiple satellite groups in addition to GPS.

SUMMARY OF THE INVENTION

It is an objective of the present invention to provide a method and apparatus that improves the accuracy of a GNSS position measurement in urban areas.

Another objective of the present invention is to provide a method and apparatus that estimates and removes a multipath error included in a non-ionosphere code in real time by combining initial position information, a multi-frequency code, and a carrier phase measurement.

Another objective of the present invention is to provide a method and apparatus that estimates multipath errors included in GNSS measurements operating in urban areas.

Another objective of the present invention is to provide a method and apparatus that improves the accuracy of GNSS position measurements for multi satellite groups without a loss of satellite visibility by removing estimated multipath errors from non-ionosphere code measurements.

According to an embodiment of the present invention, a method of performing a position measurement on the basis of a signal from a global navigation satellite system (GNSS) may be provided. The method may include: receiving initial position information; estimating an initial value of a multipath error through a measurement of the GNSS signal on the basis of the received initial position information; estimating a multipath error from the initial value of the multipath error on the basis of a change in the measurement for every epoch during without cycle slip; removing the estimated multipath error from the measurement of the GNSS signal; and performing the position measurement on the basis of the GNSS measurement from which the multipath error is removed.

In addition, according to an embodiment of the present invention, an apparatus for performing a position measurement on the basis of a signal from a global navigation satellite system (GNSS) may be provided. The apparatus may include a communication unit transmitting and receiving a signal; and a processor controlling the communication unit. Herein, the processor may receive initial position information through the communication unit; estimate an initial value of a multipath error through a measurement of the GNSS signal on the basis of the received initial position information; estimate a multipath error from the initial value of the multipath error on the basis of a change in the measurement; remove the estimated multipath error from the measurement of the GNSS signal; and perform the position measurement on the basis of the GNSS measurement from which the multipath error is removed.

In addition, according to an embodiment of the present invention, the measurement of the GNSS signal may include at least one of a pseudo-range measurement, a carrier phase measurement, and a Doppler measurement of the GNSS.

In addition, according to an embodiment of the present invention, the measurement of the GNSS signal may be measured in consideration of at least one of multiple frequencies and multiple satellite groups signal.

In addition, according to an embodiment of the present invention, the estimating of the initial value of the multipath error through the measurement of the GNSS signal on the basis of the received initial position information may include: obtaining distance information to a satellite on the basis of the received initial position information; and removing the estimated error on the basis of the obtained distance information and the measurement of the GNSS signal to estimate the initial value of the multipath error.

In addition, according to an embodiment of the present invention, when the initial value of the multipath error is estimated on the basis of the multiple frequencies, the distance information may be obtained on the basis of the multiple frequencies, and non-ionosphere pseudo-range measurement and non-ionosphere carrier phase measurement may be obtained on the basis of the obtained distance information; and the estimated error may be removed from the non-ionosphere pseudo-range measurement to estimate the initial value of the multipath error, in which the estimated error may include at least one of a satellite clock error, a user clock error, and a tropospheric error.

In addition, according to an embodiment of the present invention, when the initial value of the multipath error is estimated on the basis of the multiple satellite groups, the distance information may be obtained on the basis of the multiple satellite groups, and non-ionosphere pseudo-range measurement and non-ionosphere carrier phase measurement may be obtained on the basis of the obtained distance information; and the estimated error may be removed from the non-ionosphere pseudo-range measurement to estimate the initial value of the multipath error, in which the estimated error includes at least one of a satellite clock error, a user clock error in a reference satellite group, a tropospheric error, and an ionospheric error.

In addition, according to an embodiment of the present invention, the user clock error of the reference satellite group may be obtained on the basis of a reference time.

In addition, according to an embodiment of the present invention, the estimating of the multipath error from the initial value of the multipath error on the basis of the change in the measurement may include: detecting whether carrier phase measurement is discontinuous; estimating an amount of change in the multipath error on the basis of a difference between a pseudo-range measurement and a carrier phase measurement; and estimating the multipath error by reflecting the amount of change in the multipath error in the initial value of the multipath error.

In addition, according to an embodiment of the present invention, when the multipath error is estimated on the basis of a single frequency, the pseudo-range measurement and the carrier phase measurement may be obtained on the basis of the single frequency; an ionospheric change may be applied to correct divergence of the pseudo-range measurement and the carrier phase measurement; the amount of change in the multipath error may be estimated on the basis of a difference between the pseudo-range measurement and the carrier phase measurement in which the divergence is corrected; and the amount of change in the multipath error may be reflected in the initial value of the multipath error to estimate the multipath error.

In addition, according to an embodiment of the present invention, when the multipath error is estimated on the basis of multiple satellite groups, the pseudo-range measurement and the carrier phase measurement may be obtained in synchronization with a time of a reference satellite group, and obtained on the basis of a four-column observation matrix in which a minimum number of satellites for the position measurement is four regardless of a number of multiple satellite groups used.

According to the present invention, it is possible to provide a method and apparatus that improves the accuracy of a GNSS position measurement in urban areas.

According to the present invention, it is possible to provide a method and apparatus that estimates and removes a multipath error included in a non-ionosphere code in real time by combining initial position information, a multi-frequency code, and a carrier phase measurement.

According to the present invention, it is possible to provide a method and apparatus that estimates multipath errors included in GNSS measurements operating in urban areas.

According to the present invention, it is possible to provide a method and apparatus that improves the accuracy of GNSS position measurements for multi satellite groups without a loss of satellite visibility by removing estimated multipath errors from non-ionosphere code measurements.

Effects obtained in the present disclosure are not limited to the above-mentioned effects, and other effects not mentioned above may be clearly understood by those skilled in the art from the following description.

BRIEF DESCRIPTION OF THE DRAWINGS

The above and other objects, features, and other advantages of the present invention will be more clearly understood from the following detailed description when taken in conjunction with the accompanying drawings, in which.

DETAILED DESCRIPTION OF THE INVENTION

Figure 1:
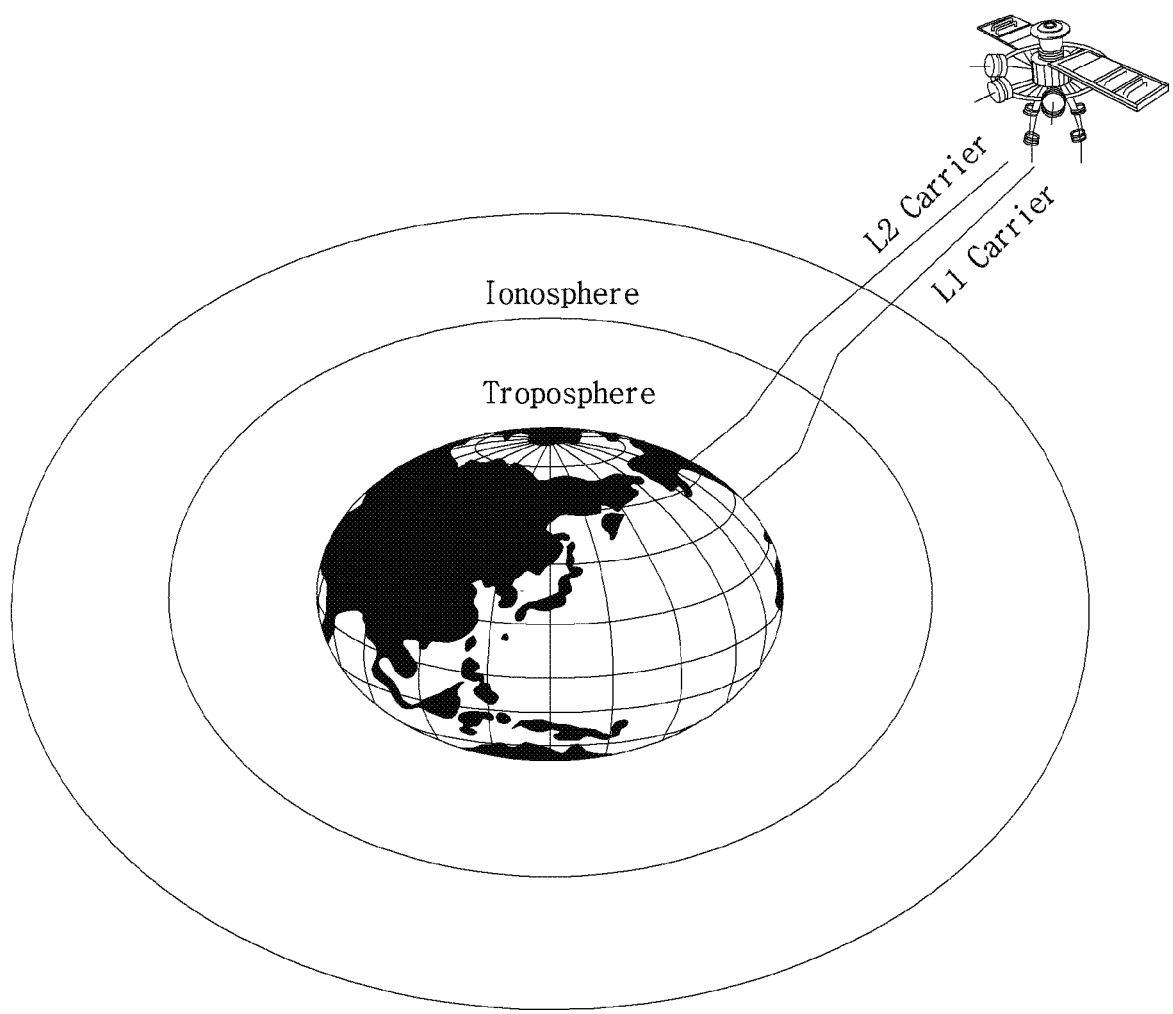
FIG. 1 is a diagram illustrating a method of receiving a signal from a satellite.

Hereinbelow, exemplary embodiments of the present disclosure will be described in detail with reference to the accompanying drawings such that the present disclosure can be easily embodied by one of ordinary skill in the art to which this invention belongs. However, the present disclosure may be variously embodied, without being limited to the exemplary embodiments.

In the description of the present disclosure, the detailed descriptions of known constitutions or functions thereof may be omitted if they make the gist of the present disclosure unclear. Also, portions that are not related to the present disclosure are omitted in the drawings, and like reference numerals designate like elements.

In the present disclosure, when an element is referred to as being "coupled to", "combined with", or "connected to" another element, it may be connected directly to, combined directly with, or coupled directly to another element or be connected to, combined directly with, or coupled to another element, having the other element intervening therebetween. Also, it should be understood that when a component "includes" or "has" an element, unless there is another opposite description thereto, the component does not exclude another element but may further include the other element.

In the present disclosure, the terms "first", "second", etc. are only used to distinguish one element, from another element. Unless specifically stated otherwise, the terms "first", "second", etc. do not denote an order or importance. Therefore, a first element of an embodiment could be termed a second element of another embodiment without departing from the scope of the present disclosure. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units.

Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components described in the various embodiments and additional other components are included in the scope of the present disclosure.

Figure 2:
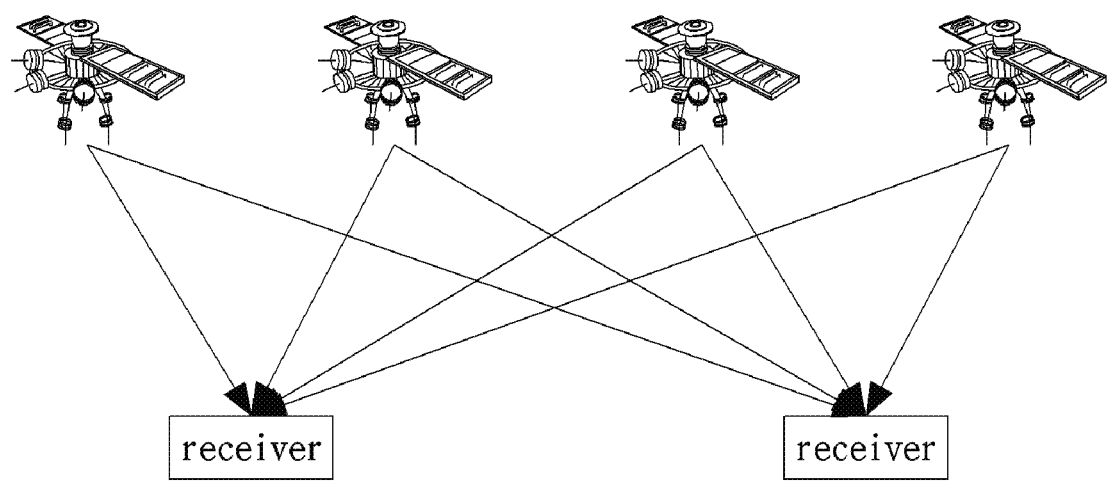
FIG. 2 is a diagram illustrating a method of receiving signals from multiple satellites.

FIG. 1 is a diagram illustrating a case where an error for a signal in a global navigation satellite system (GNSS) occurs. The GNSS signal may be a signal received from a satellite. Herein, as described above, the GNSS signal may be a signal received from a satellite at a distance of 20,000 km or more, and various errors may occur in a signal transmission process. In this case, as described above, for example, referring to FIG. 1, the GNSS signal may include an error generated by the ionosphere or the troposphere. That is, errors for the GNSS signal may occur while the GNSS signal passes through the ionosphere and the troposphere. Herein, the error as described above may be corrected on the basis of a differential GNSS (DGNSS) technique. For example, referring to FIG. 2, a signal may be corrected through signals received from a plurality of receivers, and an error correction may be performed on the basis of the signal. Accordingly, it is possible to perform correction for the common error.

Figure 3:
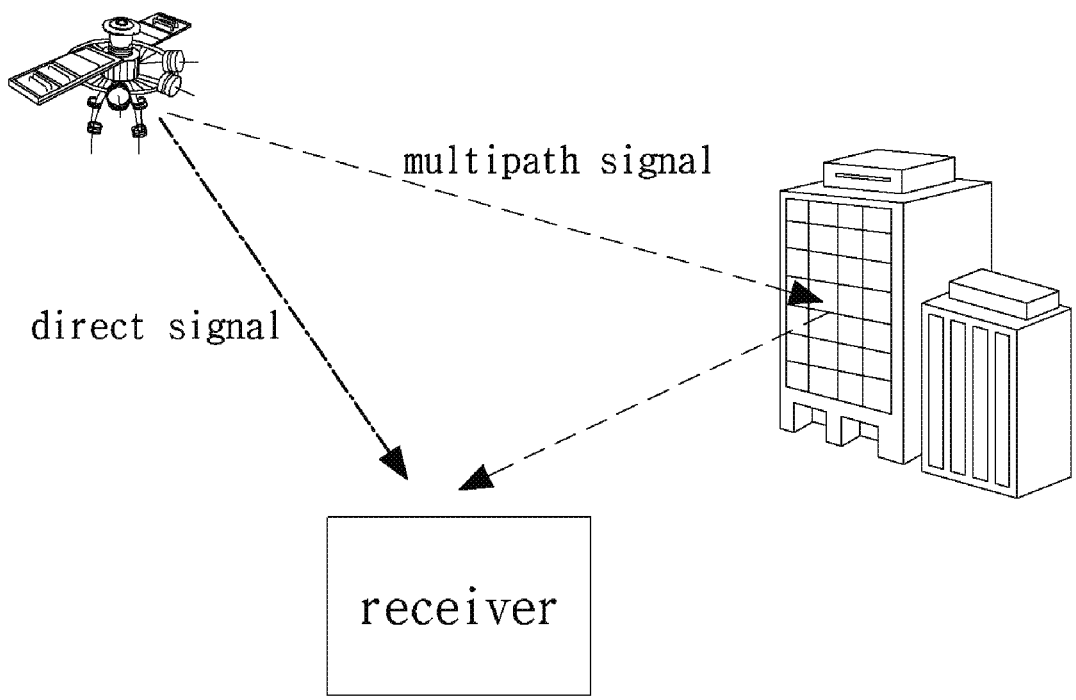
FIG. 3 is a diagram illustrating a multipath signal.

However, as an example, as shown in FIG. 3, multipath error may be an error generated according to the position of the user. For example, as described above, when the user is located in urban areas or there are many surrounding obstacles, a plurality of signals may be received in multipath as shown in FIG. 3, and thus errors may occur due to the signals. In addition, as an example, an error may occur on the basis of noises of the receiver as described above. Such an error may be generated differently according to the position of the user, and thus the error may be required to be corrected.

Figure 4:
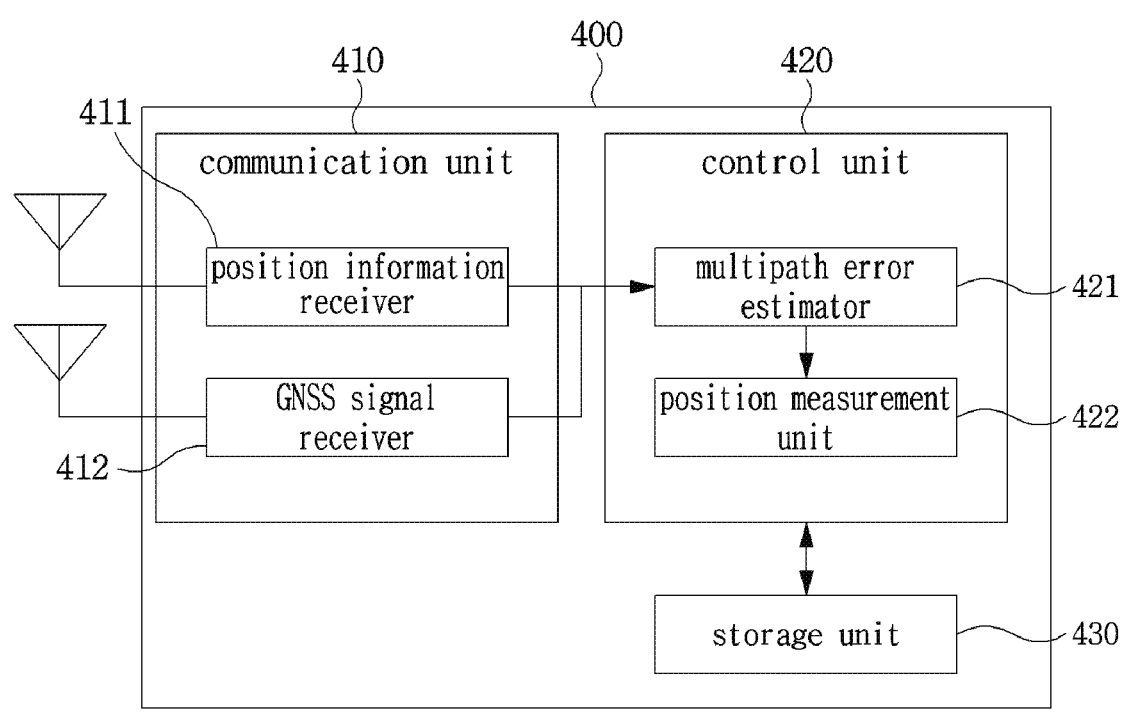
FIG. 4 is a diagram illustrating a receiving device.

In view of the foregoing, a method of estimating a multipath error and performing a position measurement for the error will be described. For example, referring to FIG. 4, the receiver 400 may include at least one of a communication unit 410, a control unit 420, and a storage unit 430. Herein, the receiver may refer to a device that receives the GNSS signal. For example, the receiver may be a ship, a car, an aircraft, a smart device, or the like that receives the GNSS signal, and the present invention is not limited thereto. That is, the receiver 400 may be a device that receives a GNSS signal. Herein, referring to FIG. 4, the communication unit 410 may include a position information receiver 411 and a GNSS signal receiver 412. In this case, the position information receiver 411 may receive the position information through a separate medium such as wireless communication or video. Also, as an example, the position information receiver 411 may receive position information from a GNSS receiver. In addition, as an example, the position information receiver 411 may receive the position information from an inertial sensor like an inertial measurement unit (IMU). That is, the position information receiver 411 may acquire the position information of the receiver 400, and the acquisition method is not limited to the above-described embodiment. Also, as an example, the GNSS signal receiver 412 may receive the GNSS signal as described above. Herein, the communication unit 410 may transfer the position information obtained from the position information receiver 411 and the GNSS signal receiver 412 to the control unit 420. For example, the position information received through the position information receiver 411 may be an initial value used to estimate a multipath error. Herein, the receiver may obtain distance information to the satellite on the basis of the above-described value.

In addition, the control unit 420 may include a multipath error estimator 421 and a position measurement unit 422. Herein, the multipath error estimator 421 calculates an error due to the multipath using position information obtained from the position information receiver 411 and the GNSS signal receiver 412, and calculates the information on the multipath error using the position measurement unit 422. Herein, the position measurement unit 422 may perform position measurements on the basis of the information obtained through the above, and then the storage unit 430 may store the information utilized in the above.

More specifically, the position information measured by the position information receiver 411 of the communication unit 410 may be used as an initial value for multipath error estimation. For example, the position information measured by the position information receiver 411 may be an initial value and thus applied only once, but the present invention is not limited thereto. For example, the initial value for the multipath error estimation may be continuously updated to monitor the quality of the estimated multipath error. The GNSS signal receiver 412 of the communication unit 410 may continuously receive a pseudo-range code measurement $\rho$, a carrier phase measurement $\phi$, and a Doppler measurement of GNSS. The GNSS signal receiver 412 may receive multiple frequencies and multiple satellite groups signals simultaneously. Herein, the satellite groups may be satellites operating in synchronization with each other. That is, the GNSS signal receiver 412 may receive signals from multiple satellites. In addition, as described above, signals may be received from a plurality of satellite groups. In addition, the pseudo-range may mean a distance between the satellite and the receiver 400 in consideration of errors capable of occurring in common as described above. For example, the pseudo-range may be determined on the basis of a signal generation time difference between "speed of light×satellite" and the receiver, but the present invention is not limited thereto. In addition, the carrier phase and the Doppler may be measured on the basis of the frequency domain and measured on the basis of the satellite displacement or the phase difference of the carrier. In addition, as an example, the receiver 400 may receive signals through multiple frequencies to measure the above-described values. In addition, the receiver 400 may receive signals from a plurality of satellites for performing the position measurement, and the present invention is not limited thereto.

Herein, in view of the foregoing, the control unit 420 may receive at least one or more of multiple satellite groups, pseudo-range codes of multiple frequencies, a carrier phase wave, and a Doppler measurement to generate a non-ionosphere measurement. For example, a pseudo-range code measurement $\rho^i_{iono-free}$ and a carrier phase measurement $\phi^i_{iono-free}$ of the i-th satellite from which the ionospheric delay error is removed at a time t are obtained on the basis of a linear combination of dual frequency measurements in Equation 1 and Equation 2 below. Herein, a carrier phase L1 and a carrier phase L2 may be used as dual frequency measurements, and the following Equation 1 and Equation 2 may be derived on the basis of the same.

$$\rho^i_{iono-free}(t) = \frac{\rho^i_{L1}(t)\gamma - \rho^i_{L2}(t)}{\gamma - 1} =$$ [Equation 1]

$$d^i(t) + c \cdot (B(t) - b^i(t)) + T^i(t) + M^i_{iono-free}(t) + \epsilon^i_{iono-free}(t)$$

$$\phi^i_{iono-free}(t) = \frac{\phi^i_{L1}\gamma - \phi^i_{L2}}{\gamma - 1}$$ [Equation 2]

$$= d^i(t) + c \cdot (B(t) - b^i(t)) + T^i(t) + m^i_{iono-free}(t) +$$

$$\epsilon^i_{iono-free}(t) + \frac{\lambda_{L1}N^i_{L1}\gamma - \lambda_{L2}N^i_{L2}}{\gamma - 1}$$

Figure 5:
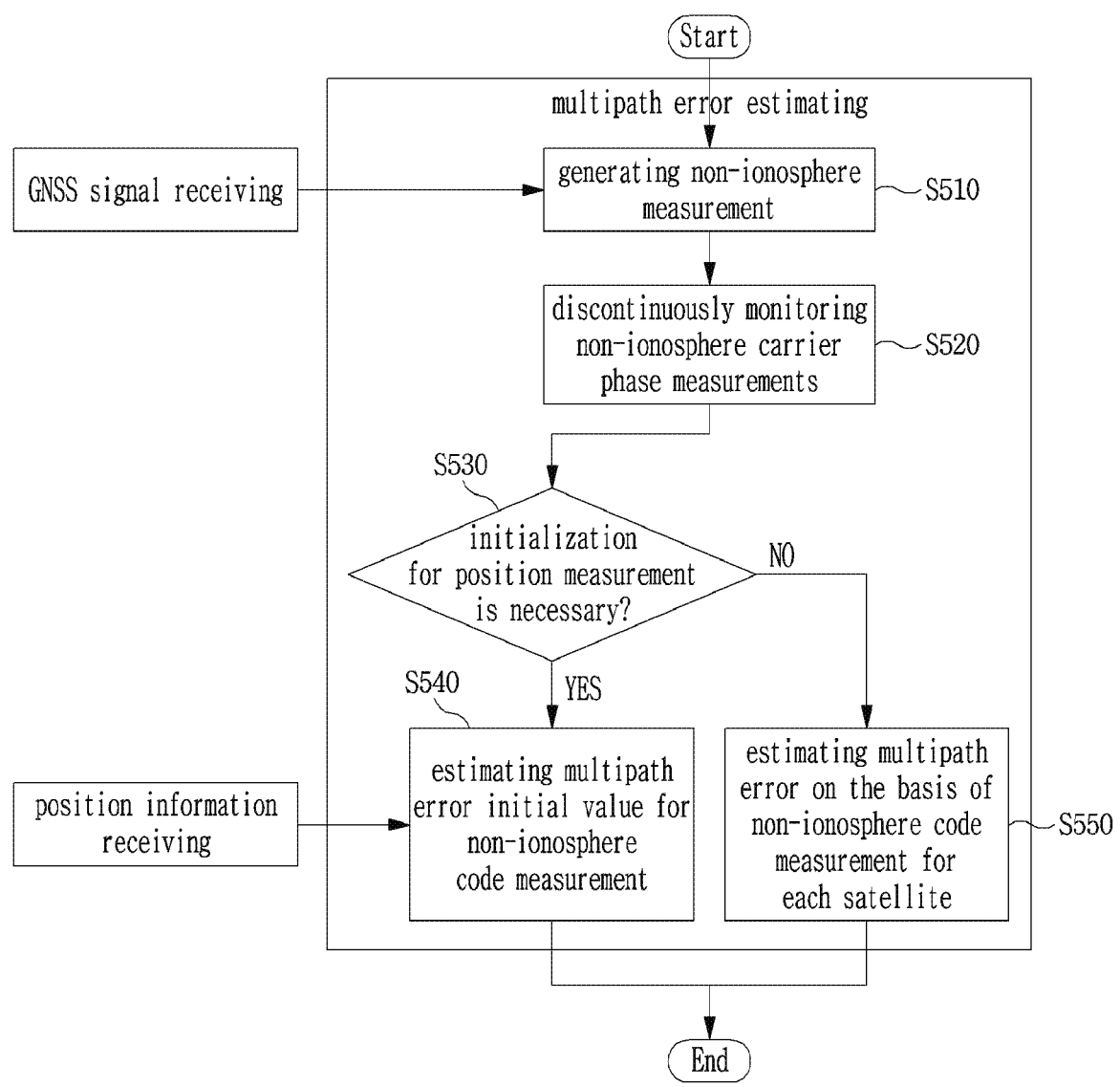
FIG. 5 is a diagram illustrating a method of estimating multipath errors.

Where, $\rho^i_{L1}$ indicates a pseudo-range code measurement of L1; $\rho^i_{L2}$ indicates a pseudo-range code measurement of L2; $\phi^i_{L1}$ indicates a carrier phase measurement of L1; and $\phi^i_{L2}$ may be a carrier phase measurement of L2. In addition, γ indicates a square value $$\frac{f_1^2}{f_2^2}$$

of a frequency ratio L1/L2, and $M^i_{iono-free}$ and $m^i_{iono-free}$ indicate pseudo-range from which the ionospheric error of the i-th satellite is removed and a multipath error included in the carrier phase measurement, respectively. Herein, d indicates a distance from the satellite to the initial position, B indicates an error in user time; $b^i$ is an error in satellite time, $T^i$ is a tropospheric delay error, and $\in^i_{iono-free}$ and $\epsilon^i_{iono-free}$ indicate a pseudo-range code from which the ionospheric delay error is removed and receiver noise included in the carrier phase measurement, respectively. In addition, N is an unknown constant included in the carrier phase measurement, and λ is a wavelength of the carrier phase measurement, in which the values thereof may vary depending on the frequencies L1 and L2. In addition, as described above, the above is described with respect to a GPS system and may correspond to a natural frequency of another multiple satellite groups system. In addition, not only the frequencies L1 and L2 described above, but also the FDMA frequencies of GLONASS, a combination of frequencies L5 and L6 may be calculated according to the non-ionospheric equation, and the present invention is not limited thereto. As a specific example, referring to FIG. 5, the control unit may generate a non-ionosphere measurement for multipath error estimation (S510). Herein, as described above, the control unit may receive a GNSS signal from the communication unit. Thereafter, the control unit may discontinuously check or monitor the non-ionosphere carrier phase measurements (S520). Then, it is determined whether initialization for position measurement is necessary (S530), and when the initialization is necessary, the control unit acquires position information reception as described above, and estimates a multipath error initial value for a non-ionosphere code measurement (S540). In addition, as an example, it is determined whether the initialization for position measurement is necessary (S530), and when the initialization is not necessary, the control unit may estimate the multipath error on the basis of the non-ionosphere code measurement for each satellite (S550).

In the case of the non-ionosphere carrier phase calculated on the basis of the above, when there is an abnormality in the measurement, such as cycle slip, it is impossible to guarantee the continuity. For example, the cycle slip may be an error that occurs when a carrier phase tracking circuit does not instantaneously check the phase value when the GNSS signal is measured. Herein, as described above, the cycle slip may occur on the basis of signal disconnection due to surrounding features, carrier phase noise, carrier phase signal strength, satellite altitude, and the like. Herein, for example, the phase difference may be changed by an integer multiple of the carrier phase wavelength by the cycle slip, and an error in distance measurement may occur on the basis of the phase difference. That is, in the case of the calculated non-ionosphere carrier, when there is an abnormality in the measurement, such as cycle slip, it is impossible to guarantee the continuity, and thus the discontinuity of the non-ionosphere carrier phase may be monitored for each satellite. Herein, compared to the previous epoch, when the continuous measurements do not meet the number of positions capable of position measurement, it is considered that the initialization for position measurement is required and the initial value of the multipath error of the non-ionosphere code measurement may be estimated on the basis of the position provided by the position information receiver. Meanwhile, when the continuous carrier phase measurement is larger than the minimum number of satellites required for position measurement, the process of estimating the multipath error included in the non-ionosphere code measurement for each satellite in the current epoch may proceed.

Herein, for example, in order to estimate an initial value of a multipath error for a non-ionosphere code measurement, an initial time $t_0$ and user position information received from a GNSS signal may be required. Herein, the initial value of the multipath error included in the measurement of GNSS may be calculated on the basis of Equation 3 below.

$$M^i_{iono-free}(t_0) \approx \rho^i_{iono-free}(t_0) - d^i(t_0) - c \cdot (B(t_0) - b^i(t_0)) - T^i(t_0)$$ [Equation 3]

Herein, $d(t_0)$, $B(t_0)$ may be calculated using the received user position. In addition, $b^i(t_0)$ may be calculated from the navigation data; $T^i(t_0)$ may use troposphere modeling or external correction information; and c indicates the speed of light.

In addition, as an example, the receiver may acquire the GNSS signal using a single frequency receiver or a single frequency measurement. That is, the receiver may receive the GNSS signal through one carrier. In addition, as an example, the receiver may receive the GNSS signal using multiple frequency receivers or multiple frequency measurements. That is, as shown in FIG. 1, the receiver may receive signals transmitted from the same satellite through different frequencies. Herein, the receiver may obtain the measurement on the basis of frequency difference and frequency phase difference, as described above. In addition, the receiver may receive GNSS signals from the multiple satellite groups. Herein, the satellite groups may operate in synchronization with each other as described above, and each of the satellite groups may operate individually as a single system. Therefore, information on synchronization, reference time, etc. may be different for each satellite group.

Herein, for example, when using a single frequency receiver or a single frequency measurement, Equation 4 below may be used by applying ionospheric error correction information $I^i(t_0)$, instead of the above equation.

$$M^i_{L1}(t_0) \approx \rho^i_{L1}(t_0) - d^i(t_0) - c \cdot (B(t_0) - b^i(t_0)) - T^i(t_0) - I^i(t_0)$$ [Equation 4]

In addition, as an example, when using measurements of multiple satellite groups, the time may not be synchronized between satellite groups. For example, when performing position measurement using a single satellite group, the position measurement may be performed by applying only four satellites in which a line of sight (LOS) is secured.

Meanwhile, when using multiple satellite groups, as described above, the time is not synchronized between satellite groups (or systems), and thus the time error for each satellite group may be determined as unknown. Therefore, it is difficult to maximize the effect of multi satellite groups since the minimum number of satellites for position measurement is increased by one whenever one satellite is added. In consideration of the above points, in order to calculate an initial value $\hat{M}^J_{iono-free}(t_0)$ of a multipath error of a satellite J which is a satellite other than GPS, the GPS clock error $ClkOffset_{GNSS}(t_0)$ which is the reference time, instead of the clock error of the GNSS, is required to be put in Equation 5 below. That is, a reference time may be needed.

$$\hat{M}^J_{iono-free}(t_0) \approx \rho^J_{iono-free}(t_0) - d^J(t_0) - c \cdot (B_{GPS}(t_0) - b^J(t_0)) - T^J(t_0) \qquad \text{[Equation 5]}$$

Herein, $\hat{M}^J_{iono-free}(t_0)$ may include a value $ClkOffset_{GNSS}(t_0)$ that is a time difference between the GNSS and the GPS, in addition to an actual multipath error $M^J_{iono-free}(t_0)$ of the GNSS as shown in Equation 6 below. Herein, for example, in Equation 5 and Equation 6, the reference time may be set to GPS. However, the reference time of another system may be used, and replacement with the corresponding system may be performed, but the present invention is not limited thereto.

$$\hat{M}^J_{iono-free}(t_0) = M^J_{iono-free}(t_0) + ClkOffset_{GNSS}(t_0) \qquad \text{[Equation 6]}$$

Figure 6:
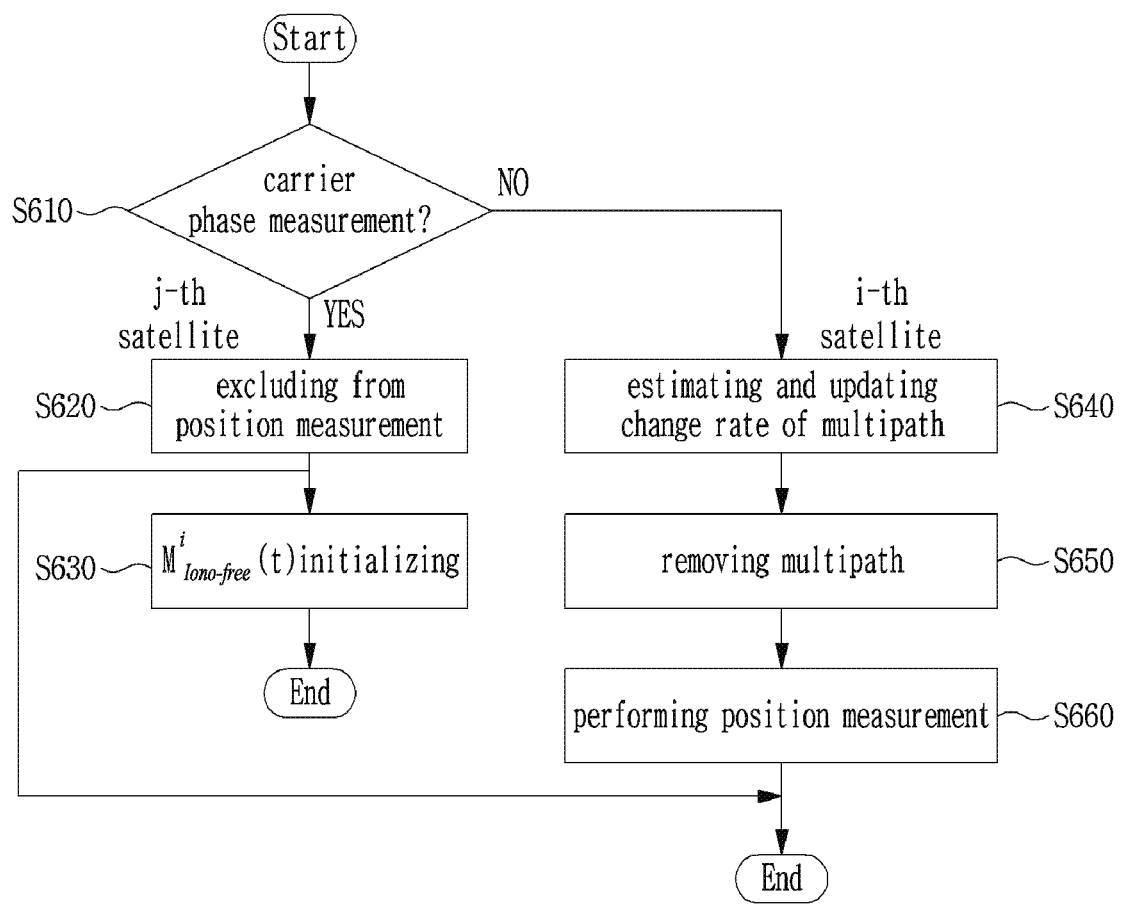
FIG. 6 is a diagram illustrating a method of performing a position measurement on the basis of whether there is a cycle slip in carrier phase measurement.

In addition, as an example, referring to FIG. 6, a method of estimating multipath error of non-ionosphere code measurement for each satellite is illustrated. Herein, it may be considered whether the above-described cycle slip is included in the carrier phase measurement for each satellite. Whether the cycle slip is included may be considered on the basis of the existing approach. For example, the following Equation 7 may show a method of detecting cycle slip by using a property of 2 cm/s or less when the change rate of the ionospheric error is normal.

$$\hat{I}_{L1}(t) = \frac{\phi^i_{L1}\gamma - \phi^i_{L2}}{\gamma - 1} + \frac{[N^i_{L2}\lambda_{L2}(t) - N^i_{L1}\lambda_{L1}(t)]}{\gamma - 1} \qquad \text{[Equation 7]}$$

$$\frac{\hat{I}_{L1}(t) - \hat{I}_{L1}(t-\Delta t)}{\Delta t} =$$

$$\frac{(\phi^i_{L1}(t)\gamma - \phi^i_{L2}(t)) - (\phi^i_{L1}(t-1)\gamma - \phi^i_{L2}(t-1))}{\Delta t(\gamma - 1)} > \text{Threshold}$$

Herein, the case in which a satellite including the cycle slip of the carrier phase measurement is referred to as the j-th satellite and a satellite that does not include an abnormal discontinuity such as cycle slip is referred to as the i-th satellite may be considered (S610). However, the forgoing is provided for the convenience of description, but the present invention is not limited thereto. Herein, the satellite including cycle slip, such as the j-th satellite, may be excluded from the position measurement (S620). Meanwhile, a normal satellite such as the i-th satellite may estimate and update the change rate of the multipath to update the current epoch value (S640). Then, the multipath may be removed from the non-ionosphere code measurement, which is shown as in Equation 8 below (S650).

$$\rho^i_{iono-free}(t) - \phi^i_{iono-free}(t) = M^i_{iono-free}(t) - m^i_{iono-free}(t) + \qquad \text{[Equation 8]}$$

$$\epsilon^i_{iono-free}(t) - \varepsilon^i_{iono-free}(t) - \frac{\lambda_{L1}N^i_{L1}\gamma - \lambda_{L2}N^i_{L2}}{\gamma - 1}$$

Where, $M^i_{iono-free}$ indicates a multipath error included in the pseudo-range measurement from which the ionospheric delay error is removed. Also, $m^i_{iono-free}$ indicates a multipath error included in the carrier phase measurement from which the ionospheric delay error is removed. $\epsilon^i_{iono-free}$, $\varepsilon^i_{iono-free}$ are receiver noises included in the pseudo-range and carrier phase measurement, respectively, and N may be an unknown constant of frequencies L1 and L2. Then, the final position measurement may be performed by reflecting the estimated multipath error in the GNSS signal measurement (S660). In this case, as an example, when the cycle slip does not occur, the unknown constant is fixed to a constant value, and in general, the multipath error included in the carrier phase measurement may have a negligible value due to the multipath included in the pseudo-range. In addition, as an example, a change rate in a time difference Δ between the pseudo-range with the ionospheric delay error removed and the carrier phase measurement may be expressed as Equation 9 below.

$$\Delta M^i_{iono-free}(t) \approx \Delta(\rho^i_{iono-free}(t) - \phi^i_{iono-free}(t)) \qquad \text{[Equation 9]}$$

$$\therefore \hat{M}^i_{iono-free}(t) = M^i_{iono-free}(t_0) + \int \Delta M^i_{iono-free}(t) \qquad \text{[Equation 10]}$$

Herein, In the case of using a single frequency receiver or a single frequency measurement in consideration of the foregoing, a change in the ionosphere between the code and the carrier phase may be reflected as shown in Equation 11 below.

$$\rho^i_{L1}(t) - \phi^i_{L1}(t) = M^i_{L1}(t) - m^i_{L1}(t) + \epsilon^i_{L1}(t) - \varepsilon^i_{L1}(t) - \lambda_{L1}N^i_{L1} \qquad \text{[Equation 11]}$$

For example, the following Equation 12 may be used by applying a time variation of an ionospheric error $I^i(t_0)$, instead of the equation applied to the dual frequency.

$$\Delta M^i_{L1}(t) \approx \Delta(\rho^i_{L1}(t) - \phi^i_{L1}(t) + 2I^i(t_0)) \therefore \hat{M}^i_{L1}(t) = M^i_{L1}(t_0) + \int \Delta M^i_{L1}(t) \qquad \text{[Equation 12]}$$

In addition, the multipath estimate $\hat{M}^J_{iono-free}(t)$ of the multiple satellite groups may be updated on the basis of Equation 13 below.

$$\hat{M}^J_{iono-free}(t) = \hat{M}^J_{iono-free}(t_0) + ClkOffset_{GNSS}(t_0) + \int \Delta (\hat{M}^J_{iono-free}(t)) \qquad \text{[Equation 13]}$$

The multipath error calculated as described above is subtracted from the non-ionosphere code measurement as in the following equation, and then the non-ionosphere code measurement $\tilde{\rho}^i_{iono-free}$ from which the multipath error is removed or the L1 code measurement $\tilde{\rho}^i_{L1}$ is calculated as shown in Equation 14 below to be used for position measurement.

$$\tilde{\rho}^i_{iono-free}(t) = \rho^i_{iono-free}(t) - \hat{M}^i_{iono-free}(t)$$

$$\tilde{\rho}^i_{L1}(t) = \rho^i_{L1}(t) - \hat{M}^i_{L1}(t) \qquad \text{[Equation 14]}$$

Herein, for example, since GNSS uses a stable atomic clock, it may be assumed that a value $ClkOffset_{GNSS}$ between $t_0$ and t is constant. In addition, when the error is eliminated by putting the estimated value into the measurement equation, it is possible to obtain a value from which a clock offset between two systems is removed on the basis of Equation 15 and Equation 16 below.

$$\rho^{J}_{iono\text{-}free}(t) - \hat{M}^{J}_{iono\text{-}free}(t) - \hat{T}^{J} + \hat{b}^{J} \cdot c \approx d^{J}(t) + B_{GPS}(t) \cdot c \qquad \text{[Equation 15]}$$

$$\rho^{J}_{iono\text{-}free}(t) - \hat{M}^{J}_{iono\text{-}free}(t) - \hat{T}^{J} + \hat{b}^{J} \cdot c \approx d^{J}(t) + B_{GPS}(t) \cdot c \qquad \text{[Equation 16]}$$

In addition, for example, when the time between GPS and GNSS is not corrected, the matrix of the navigation equation may be configured as shown in matrix of Equation 17 below.

$$H = \begin{bmatrix} e^{i}_{GPS} & -1 & 0 & 0 \\ \vdots & & \vdots & \\ e^{i}_{GLONASS} & 0 & -1 & 0 \\ \vdots & & \vdots & \\ e^{i}_{BeiDou} & 0 & 0 & -1 \\ \vdots & & \vdots & \end{bmatrix} \qquad \text{[Equation 17]}$$

However, as described above, since the time difference between the GPS and the GNSS is corrected in the multipath error estimation process, the above-described measurements may be put in the navigation equation so that the position measurement may be performed. Therefore, the minimum number of visible satellites may always be kept at four.

$$H = \begin{bmatrix} e^{i}_{GPS} & -1 \\ \vdots & \vdots \\ e^{i}_{GLONASS} & -1 \\ \vdots & \vdots \\ e^{i}_{BeiDou} & -1 \\ \vdots & \vdots \end{bmatrix} \qquad \text{[Equation 18]}$$

In addition, as an example, the position measurement value derived as described above may be used to calculate an initial value of multipath error of satellites requiring cycle slip, such as j-th satellite, and a detailed equation may be as shown in Equation 19 below (S630).

$$M^{J}_{iono\text{-}free}(t) \approx \rho^{J}_{iono\text{-}free}(t) - d^{J}(t) - c \cdot (B(t) - b^{J}(t)) - T^{J}(t) \qquad \text{[Equation 19]}$$

Figure 7:
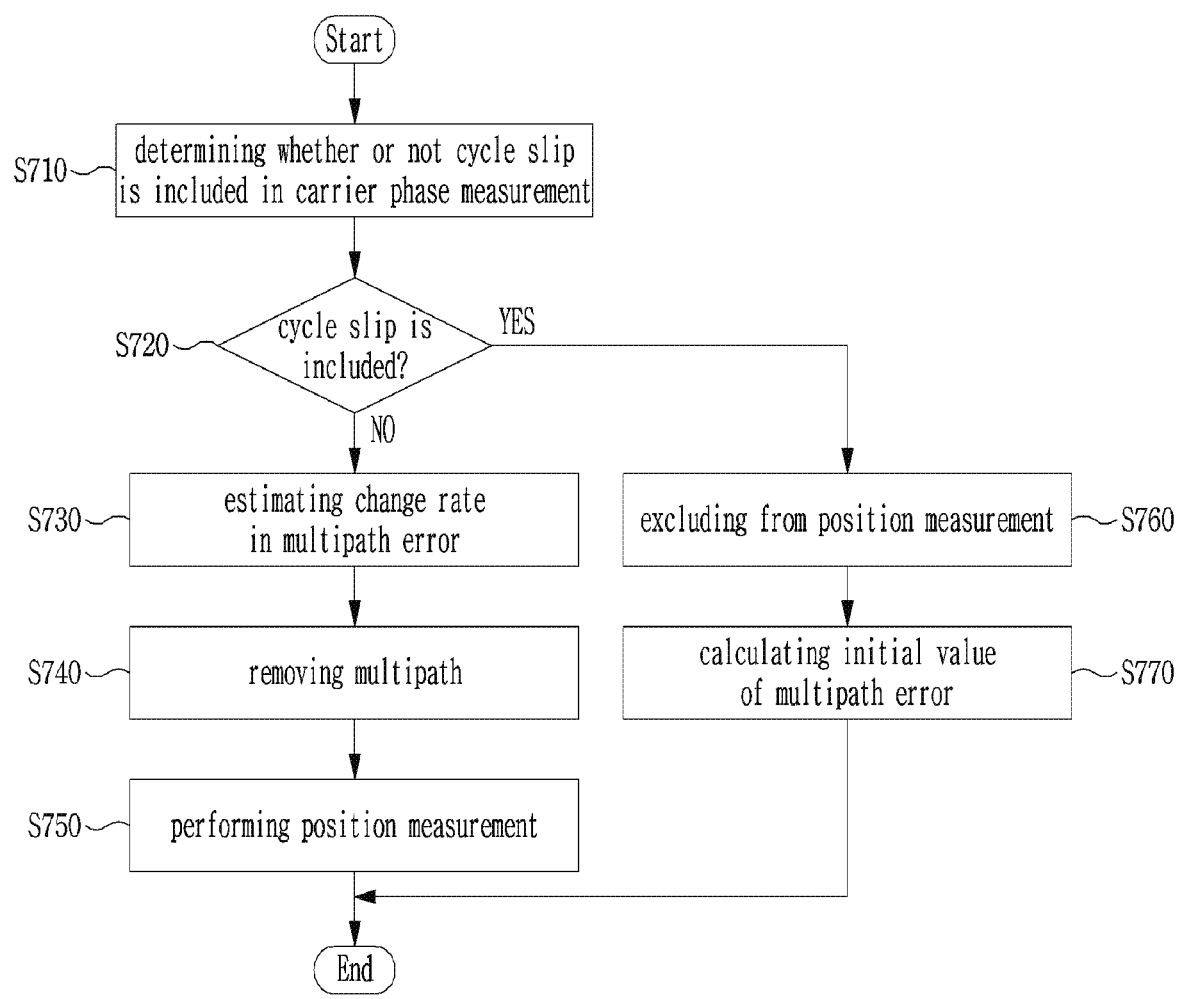
FIG. 7 is a diagram illustrating a method of performing a position measurement in one satellite.

FIG. 7 illustrates a method of estimating multipath errors from one satellite. As described above, it may be determined whether or not a cycle slip is included in a carrier phase measurement for a specific satellite (S710). In other words, the receiver may determine whether the cycle slip is included in the carrier phase measurement through the GNSS signal measurement obtained from a specific satellite. Herein, for example, the receiver may receive initial position information as described above. Herein, the receiver may estimate the initial value of the multipath error through the GNSS signal measurement on the basis of the received initial position information, as described above. Herein, the GNSS signal measurement may include at least one of a pseudo-range measurement, a carrier phase measurement, and a Doppler measurement of the GNSS as described above. In addition, as an example, the GNSS signal measurement may be obtained in consideration of at least one of multiple frequency and multi satellite groups signal, as described above. Herein, the non-ionosphere measurement may be generated in consideration of the error estimated from the GNSS signal measurement. Herein, the non-ionosphere measurement value may include at least one of the non-ionosphere pseudo-range measurement value and the carrier phase measurement. Herein, when the above-described carrier phase measurement does not include cycle slip (S720), the receiver may estimate a change rate in the multipath error (S730).

Herein, the change rate in the multipath error may be measured on the basis of the difference between a pseudo range measurement and a carrier phase measurement. The multipath error may be estimated by reflecting an amount of change of the multipath error in the initial value of the multipath error. Herein, for example, when the multipath error is estimated on the basis of a single frequency, the pseudo-range measurement and the carrier phase measurement may be obtained on the basis of a single frequency. Herein, the divergence of the pseudo-range measurement and the carrier phase measurement may be compensated by applying the amount of change of ionosphere, and the amount of change in the multipath error may be estimated on the basis of a difference between the pseudo-range measurement and the carrier phase measurement in which the divergence is corrected. In addition, the multipath error may be estimated by reflecting the amount of change of the multipath error in the initial value of the multipath error. In addition, as an example, when a multipath error is estimated on the basis of multiple satellite groups, the pseudo-range measurement and the carrier phase measurement are acquired in synchronization with the time of the reference satellite group, and obtained on the basis of a four-column observation matrix in which the minimum number of satellites for position measurement is four regardless of the number of multiple satellite groups used, as described above. Thereafter, the receiver may remove the multipath by applying the estimated multipath error to the GNSS signal measurement (740), and perform the position measurement (S750). Herein, for example, the position measurement may be reflected in an initial value of another satellite, as described above. In addition, as an example, when the above-described carrier phase measurement does not include cycle slip (S720), the receiver may exclude the position measurement for the satellite (S760). Herein, the receiver may calculate the initial value of the multipath error, as described above (S770).

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:

1. A method of performing a position measurement on the basis of a signal from a global navigation satellite system (GNSS), the method comprising:
receiving initial position information;
estimating an initial value of a multipath error through a measurement of the GNSS signal on the basis of the received initial position information;
estimating a multipath error from the initial value of the multipath error on the basis of a change in the measurement;
removing the estimated multipath error from the measurement of the GNSS signal; and
performing the position measurement on the basis of the GNSS measurement from which the multipath error is removed,
wherein the estimating of the initial value of the multipath error through the measurement of the GNSS signal on the basis of the received initial position information includes:
obtaining distance information to a satellite on the basis of the received initial position information; and
estimating the initial value of the multipath error using the obtained distance information.

2. The method of claim 1, wherein the measurement of the GNSS signal includes at least one of a pseudo-range measurement, a carrier phase measurement, and a Doppler measurement of the GNSS.

3. The method of claim 1, wherein the measurement of the GNSS signal is measured in consideration of at least one of multiple frequencies and multiple satellite groups signal.

4. The method of claim 1, wherein the estimating of the initial value of the multipath error through the measurement of the GNSS signal on the basis of the received initial position information includes:
removing the estimated error on the basis of the obtained distance information and the measurement of the GNSS signal to estimate the initial value of the multipath error.

5. The method of claim 4,
wherein when the initial value of the multipath error is estimated on the basis of the multiple frequencies, the distance information is obtained on the basis of the multiple frequencies, and non-ionosphere pseudo-range measurement and non-ionosphere carrier phase measurement are obtained on the basis of the obtained distance information; and
the estimated error is removed from the non-ionosphere pseudo-range measurement to estimate the initial value of the multipath error, in which the estimated error includes at least one of a satellite clock error, a user clock error, and a tropospheric error.

6. The method of claim 4,
wherein when the initial value of the multipath error is estimated on the basis of the multiple satellite groups, the distance information is obtained on the basis of the multiple satellite groups, and non-ionosphere pseudo-range measurement and non-ionosphere carrier phase measurement are obtained on the basis of the obtained distance information; and
the estimated error is removed from the non-ionosphere pseudo-range measurement to estimate the initial value of the multipath error, in which the estimated error includes at least one of a satellite clock error, a user clock error in a reference satellite group, a tropospheric error, and an ionospheric error.

7. The method of claim 6, wherein the user clock error of the reference satellite group is obtained on the basis of a reference time.

8. The method of claim 1, wherein the estimating of the multipath error from the initial value of the multipath error on the basis of the change in the measurement includes:
detecting whether carrier phase measurement is discontinuous;
estimating an amount of change in the multipath error on the basis of a difference between a pseudo-range measurement and a carrier phase measurement; and
estimating the multipath error by reflecting the amount of change in the multipath error in the initial value of the multipath error.

9. The method of claim 8,
wherein when the multipath error is estimated on the basis of a single frequency, the pseudo-range measurement and the carrier phase measurement are obtained on the basis of the single frequency;
an ionospheric change is applied to correct divergence of the pseudo-range measurement and the carrier phase measurement;
the amount of change in the multipath error is estimated on the basis of a difference between the pseudo-range measurement and the carrier phase measurement in which the divergence is corrected; and
the amount of change in the multipath error is reflected in the initial value of the multipath error to estimate the multipath error.

10. The method of claim 8, wherein when the multipath error is estimated on the basis of multiple satellite groups, the pseudo-range measurement and the carrier phase measurement are obtained in synchronization with a time of a reference satellite group, and obtained on the basis of a four-column observation matrix in which a minimum number of satellites for the position measurement is four regardless of a number of multiple satellite groups used.

11. An apparatus for performing a position measurement on the basis of a signal from a global navigation satellite system (GNSS), the apparatus comprising:
a communication unit transmitting and receiving a signal; and
a processor controlling the communication unit,
wherein the processor:
receives initial position information through the communication unit;
estimates an initial value of a multipath error through a measurement of the GNSS signal on the basis of the received initial position information;
estimates a multipath error from the initial value of the multipath error on the basis of a change in the measurement;
removes the estimated multipath error from the measurement of the GNSS signal; and
performs the position measurement on the basis of the GNSS measurement from which the multipath error is removed, and
wherein when the processor estimates the initial value of the multipath error through the measurement of the GNSS signal on the basis of the received initial position information, the processor obtains distance information to a satellite on the basis of the received initial position information and estimates the initial value of the multipath error using the obtained distance information.

12. The apparatus of claim 11, wherein the measurement of the GNSS signal includes at least one of a pseudo-range measurement, a carrier phase measurement, and a Doppler measurement of the GNSS.

13. The apparatus of claim 11, wherein the measurement of the GNSS signal is measured in consideration of at least one of multiple frequencies and multiple satellite groups signal.

14. The apparatus of claim 11,
wherein when the processor estimates the initial value of the multipath error through the measurement of the GNSS signal on the basis of the received initial position information, the processor removes the estimated error on the basis of the obtained distance information and the measurement of the GNSS signal to estimate the initial value of the multipath error.

15. The apparatus of claim 14,
wherein when the initial value of the multipath error is estimated on the basis of the multiple frequencies, the distance information is obtained on the basis of the multiple frequencies, and non-ionosphere pseudo-range measurement and non-ionosphere carrier phase measurement are obtained on the basis of the obtained distance information; and
the estimated error is removed from the non-ionosphere pseudo-range measurement to estimate the initial value of the multipath error, in which the estimated error includes at least one of a satellite clock error, a user clock error, a tropospheric error, and an ionospheric error.

16. The apparatus of claim 14,
wherein when the initial value of the multipath error is estimated on the basis of the multiple satellite groups, the distance information is obtained on the basis of the multiple satellite groups, and non-ionosphere pseudo-range measurement and non-ionosphere carrier phase measurement are obtained on the basis of the obtained distance information; and
the estimated error is removed from the non-ionosphere pseudo-range measurement to estimate the initial value of the multipath error, in which the estimated error includes at least one of a satellite clock error, a user clock error in a reference satellite group, a tropospheric error, and an ionospheric error.

17. The apparatus of claim 16, wherein the user clock error of the reference satellite group is obtained on the basis of a reference time.

18. The apparatus of claim 11,
wherein when the processor estimates the multipath error from the initial value of the multipath error on the basis of the change in the measurement, the processor, detects whether carrier phase measurement is discontinuous;
estimates an amount of change in the multipath error on the basis of a difference between a pseudo-range measurement and a carrier phase measurement; and
estimating the multipath error by reflecting the amount of change in the multipath error in the initial value of the multipath error.

19. The apparatus of claim 18,
wherein when the multipath error is estimated on the basis of a single frequency, the pseudo-range measurement and the carrier phase measurement are obtained on the basis of the single frequency;
an ionospheric change is applied to correct divergence of the pseudo-range measurement and the carrier phase measurement;
the amount of change in the multipath error is estimated on the basis of a difference between the pseudo-range measurement and the carrier phase measurement in which the divergence is corrected; and
the amount of change in the multipath error is reflected in the initial value of the multipath error to estimate the multipath error.

20. The apparatus of claim 18, wherein when the multipath error is estimated on the basis of multiple satellite groups, the pseudo-range measurement and the carrier phase measurement are obtained in synchronization with a time of a reference satellite group, and obtained on the basis of a four-column observation matrix in which a minimum number of satellites for the position measurement is four regardless of a number of multiple satellite groups used.

* * * * *